United States Patent
Tu et al.

(10) Patent No.: US 9,577,787 B2
(45) Date of Patent: Feb. 21, 2017

(54) ROBUST LOW RATE DATA CHANNEL IN LPI MODE FOR ENERGY-EFFICIENT ETHERNET APPLICATIONS

(71) Applicant: Broadcom Corporation, Irvine, CA (US)

(72) Inventors: Chung Ming Tu, Irvine, CA (US); James Graba, Longmont, CO (US); Peiqing Wang, Laguna Beach, CA (US); Ahmad Chini, Mission Viejo, CA (US); Yencheng Chen, Fremont, CA (US); Ba-Zhong Shen, Irvine, CA (US); Mehmet Vakif Tazebay, Irvine, CA (US)

(73) Assignee: BROADCOM CORPORATION, Irvine, CA (US)

( * ) Notice: Subject to any disclaimer, the term of this patent is extended or adjusted under 35 U.S.C. 154(b) by 0 days.

(21) Appl. No.: 14/627,539

(22) Filed: Feb. 20, 2015

(65) Prior Publication Data
US 2016/0204900 A1    Jul. 14, 2016

Related U.S. Application Data (60) Provisional application No. 62/101,021, filed on Jan. 8, 2015, provisional application No. 62/102,188, filed on Jan. 12, 2015.

(51) Int. Cl.
| | |
|---|---|
| *G06F 11/00* | (2006.01) |
| *H04L 1/00* | (2006.01) |
| *G06F 11/10* | (2006.01) |
| *H04L 12/12* | (2006.01) |

(52) U.S. Cl.
CPC ........... *H04L 1/0041* (2013.01); *G06F 11/10* (2013.01); *H04L 1/0045* (2013.01); *H04L 1/0057* (2013.01); *H04L 12/12* (2013.01)

(58) Field of Classification Search
CPC ........ H04B 3/32; H04L 12/12; H04L 1/0041; H04L 1/0045; Y02B 60/34; Y02B 60/35; G06F 11/10
See application file for complete search history.

(56) References Cited

U.S. PATENT DOCUMENTS

| | | | |
|---|---|---|---|
| 8,230,240 B2 * | 7/2012 | Diab | G06F 1/3209 713/300 |
| 8,885,506 B2 | 11/2014 | Chini et al. | |
| 2009/0204836 A1 * | 8/2009 | Diab | H04L 12/12 713/323 |

(Continued)

OTHER PUBLICATIONS

Graba, Jim, EEE Update for 1000Base-T1, Nov. 4, 2014, IEEE 802.3bp Task Force, San Antonio, Texas, 8 pages.

(Continued)

*Primary Examiner* — David Ton
(74) *Attorney, Agent, or Firm* — Oblon, McClelland, Maier & Neustadt, L.L.P.

(57) ABSTRACT

A communication technique for energy efficient Ethernet (EEE) employs a systematic block forward error correcting code (FEC). The technique aligns a low power idle (LPI) refresh signal with the FEC frame. The refresh signal includes a known reference sequence, FEC systematic symbols, and FEC parity symbols. The technique may apply shortened FEC encoding and decoding on the partial data symbols and the parity symbols.

21 Claims, 9 Drawing Sheets

(56) References Cited

U.S. PATENT DOCUMENTS

| | | | |
|---|---|---|---|
| 2010/0046543 A1* | 2/2010 | Parnaby | H04L 12/12 370/465 |
| 2013/0054995 A1* | 2/2013 | Dove | H04L 12/40032 713/323 |
| 2013/0268783 A1* | 10/2013 | Diab | H04L 12/12 713/310 |
| 2014/0229751 A1 | 8/2014 | Fnu et al. | |

OTHER PUBLICATIONS

Lo, William, Training & EEE Baseline, Nov. 2014, IEEE 802.3bp—Plenary Meeting, 11 pages.

Draft Standard for Ethernet Amendment 3: Physical Layer Specifications and Management Parameters for 1 Gb/s Operation over a Single Twisted Pair Copper Cable, Dec. 8, 2014, IEEE Standards Association Department, Piscataway, New Jersey, 104 pages.

IEEE 802.3az Energy Efficient Ethernet: Build Greener Networks, 2011, Cisco Systems, Inc., San Jose, California and Intel Corporation, Santa Clara, California, 9 pages.

* cited by examiner

ROBUST LOW RATE DATA CHANNEL IN LPI MODE FOR ENERGY-EFFICIENT ETHERNET APPLICATIONS

PRIORITY CLAIM

This application claims priority to provisional application Ser. No. 62/101,021, filed Jan. 8, 2015, and to provisional application Ser. No. 62/102,188, filed Jan. 12, 2015, which are entirely incorporated by reference.

TECHNICAL FIELD

This disclosure relates to network communications. This disclosure also relates to communication during Ethernet low power idle (LPI) mode.

BACKGROUND

High speed data networks form part of the backbone of what has become indispensable worldwide data connectivity. Within the data networks, network devices, such as switches and routers, direct data packets according to a given communication protocol. Improvements in communication techniques will further enhance the performance and capabilities of data networks.

DETAILED DESCRIPTION

Figure 1:
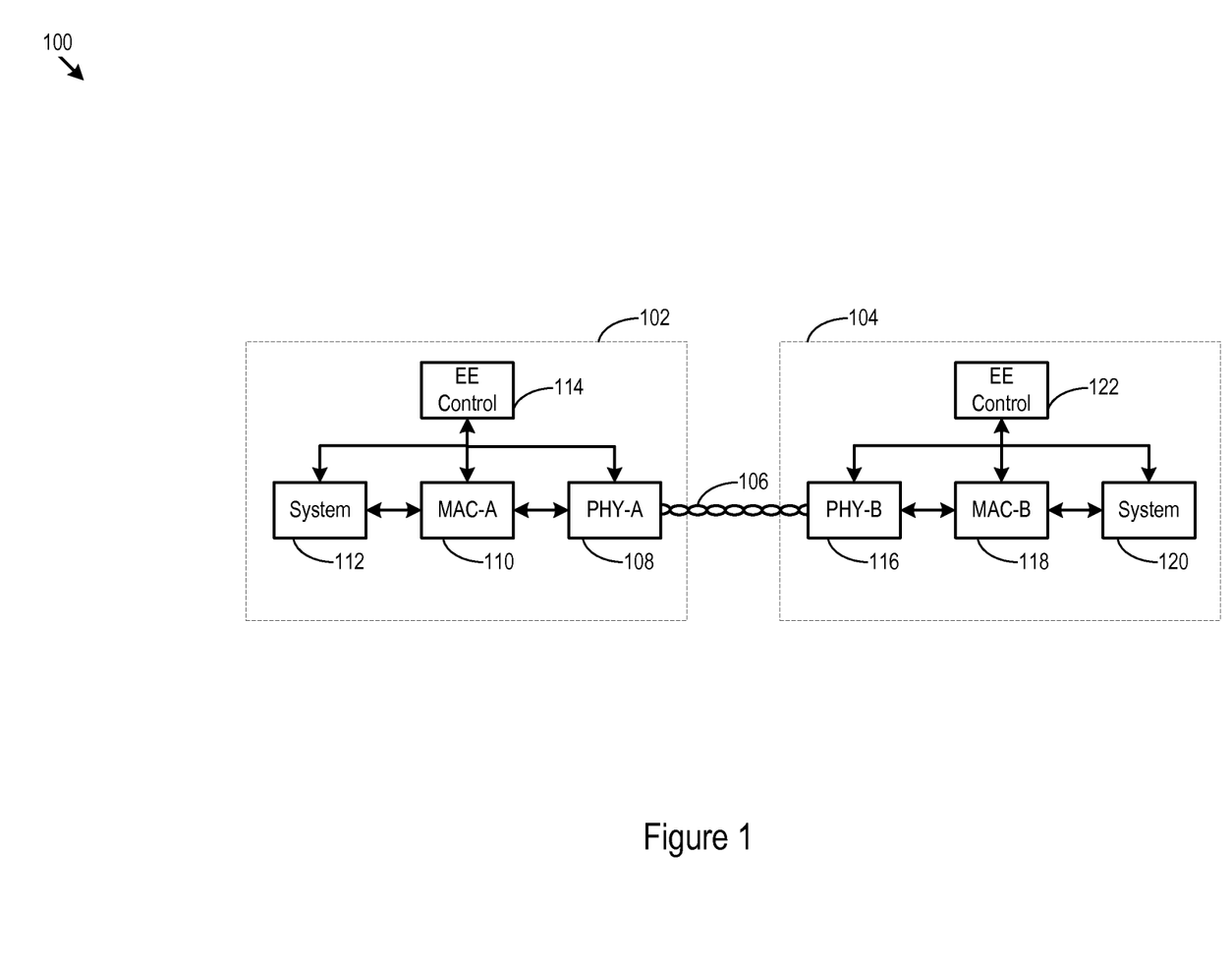
FIG. 1 shows an example communication system in which a first device communicates with a second device over a communication link.

FIG. 1 shows an example communication system 100 in which two link partners, a first device 102 and a second device 104, communicate over a communication link 106. There may be any number of link partners and the link partners may take virtually any form, including as just a few examples: switches, bridges, hubs, servers, client, wireless access point, routers, peripheral devices (e.g., video cameras, voice-over-IP phones, or printers), tablet, laptop, or desktop computers, or any other network device. The link partners may communicate according to virtually any communications protocol, including Ethernet. The link partners may implement low power modes of operation, such as those defined in IEEE 802.3az, to facilitate energy efficient operation.

The IEEE 802.3az standard defines a low power idle (LPI) mode of operation in support of energy efficient Ethernet (EEE). In a network device that implements the LPI mode, energy efficiency control circuitry determines, responsive to link utilization, whether to enter LPI mode to save power. During LPI mode, the media access control (MAC) layer and physical (PHY) layer circuitry in the device transmit refresh signals at defined intervals. The refresh signal help to maintain the link and also to facilitate resumption of the link at high speeds, after LPI mode ends and high speed data transfer resumes.

FIG. 1 shows an example implementation of the first device 102. A physical layer (PHY) interface 108 connects the first device 102 to the communication link 106. The PHY interface 108 may be a wireline, optical, or wireless interface. Accordingly, as examples, communication link 106 may be implemented as twisted pair cable, backplanes, fiber optic cables, or any other media. The first device 102 also includes media access control (MAC) circuitry 110 that accepts data from the system 112 for transmission over the communication link 106, and that receives data for delivery to the system 112 after reception over the communication link 106. Energy efficiency control circuitry 114 may determine whether and for how long the PHY 108 communicates in a low power mode, e.g., the LPI mode. The system 112 may represent any data source or data sink, including hardware, software (e.g., application programs), or a combination of both. The second device 104 may also include a PHY interface 116, MAC circuitry 118, a system 120, and EE control circuitry 122.

Note that the link partners may have asymmetric transfer rates. As one example, the first device 102 may be an automobile control system, and the second device 104 may be an automotive video camera. Although the majority of data transfer may be in one direction (e.g., video frames sent from the camera to the control system), there may still be a lower data rate transfer in the opposite direction (e.g., configuration and control commands sent to the camera). In such situations, the lower data rate direction may operate in the LPI mode, while the higher data rate direction may operate in the nominal data rate node. However, both or neither link partner may operate in LPI mode as decided by the EE control circuitry.

Figure 2:
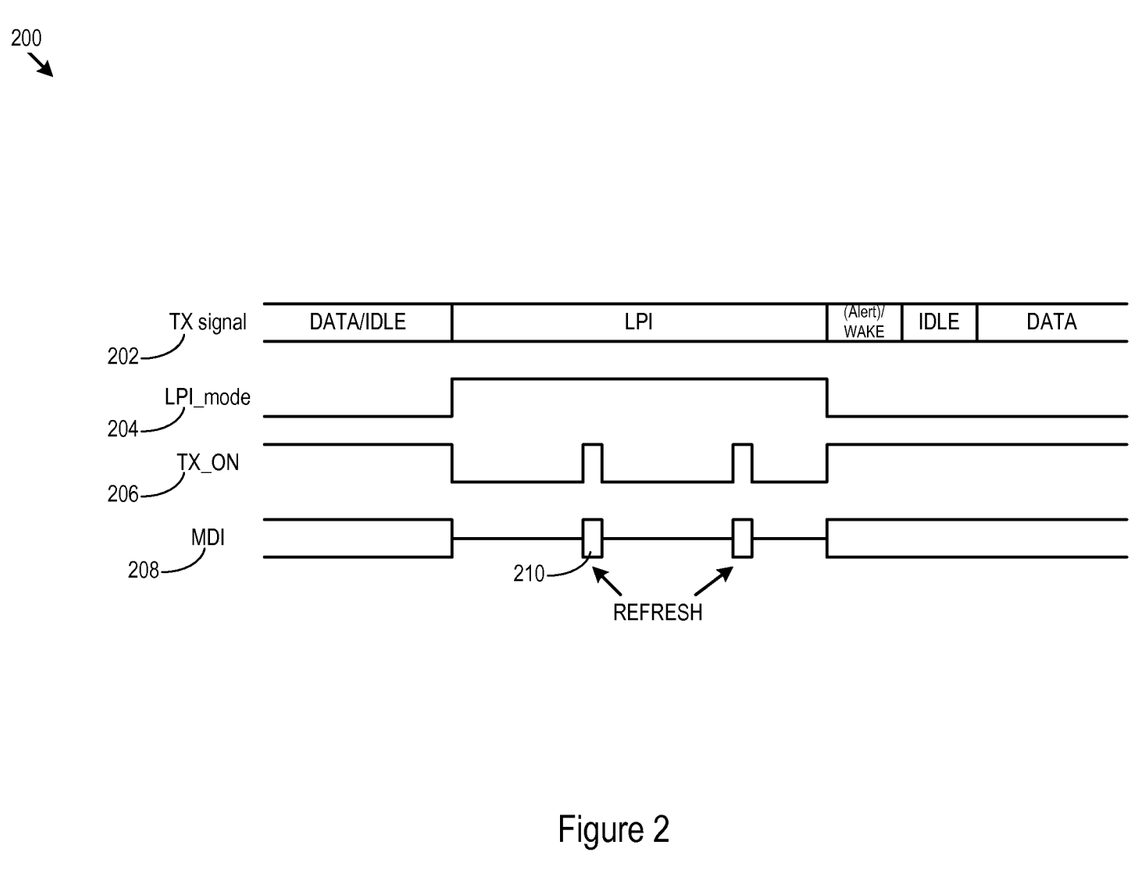
FIG. 2 is an example of refresh signaling.

FIG. 2 illustrates example refresh signaling 200. FIG. 2 shows that the TX signal 202 transitions from a nominal data rate mode to LPI mode. The EE control circuitry may transition the link partner transmissions to LPI mode when, for instance, transmission rate has fallen below a transition threshold, or when another criterion is met. The LPI mode signal 204 shows when the transmitter has entered LPI mode. In order to help maintain link timing and resume full speed operation, the EE control circuitry may turn on the transmitter, as shown by the TX_ON signal 206, and transmit refresh signals 210 through the PHY, as shown by the medium dependent interface (MDI) signal 208.

Figure 3:
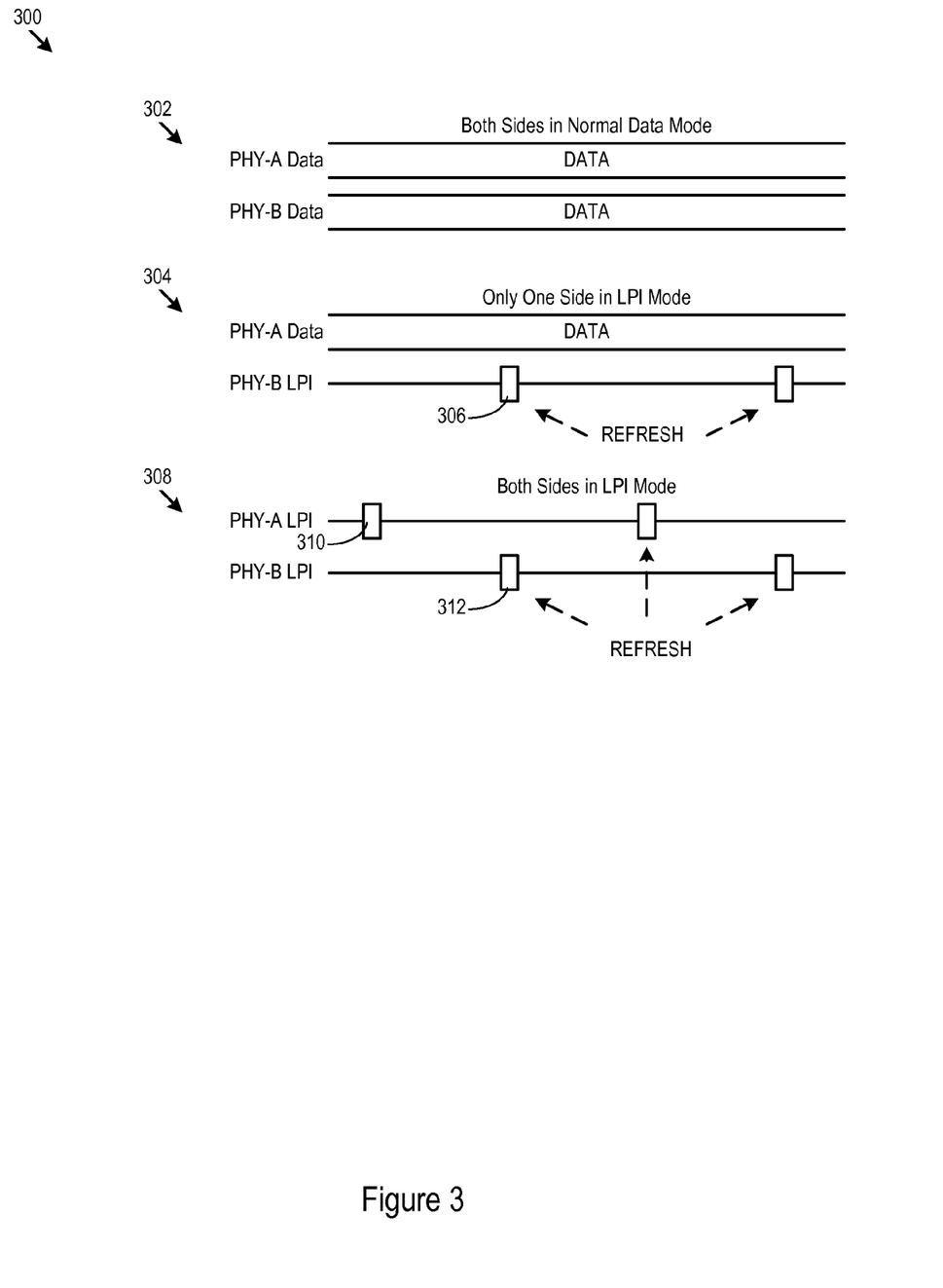
FIG. 3 illustrates additional examples of refresh signaling.

FIG. 3 illustrates additional examples of refresh signaling 300. In the example 302, both link partners operate in the nominal data transmission mode (e.g., at a full 10 Mbps, 100 Mbps, or 1 Gbps speed). The example 304 shows that either one of the link partners may be in LPI mode and transmitting refresh signals 306, with the other link partner operating at the nominal transmission rate. The example 308 shows that both link partners may be in LPI mode, with the first link partner transmitting refresh signals 310, and the second link partner transmitting refresh signals 312. Note that the refresh signals 310 and 312 may be staggered in time so that they do not overlap, thereby easing PHY training and mitigating interference effects.

Figure 4:
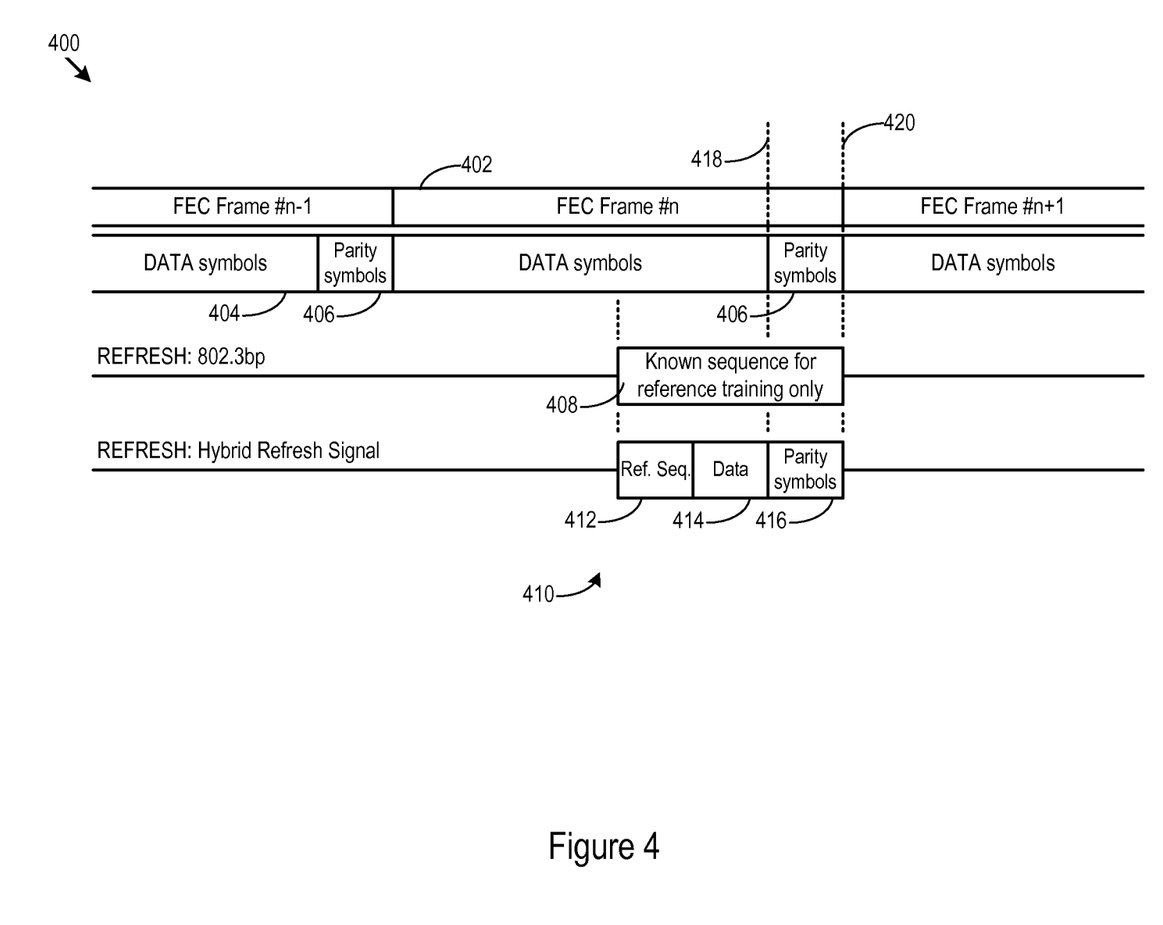
FIG. 4 refresh signaling in further detail.

FIG. 4 illustrates refresh signaling 400 in further detail. FIG. 4 shows that the MAC circuitry may send data in frames over the PHY. The frames may be forward error correcting (FEC) frames 402. Each FEC frame 402 may include data symbols 404 and parity symbols 406 as specified by an established standard (e.g., IEEE 802.3bp) or protocol. In 802.3bp, a refresh signal 408 includes a known sequence that the link partner receives and uses only for reference training.

FIG. 4 also illustrates a hybrid refresh signal 410. The hybrid refresh signal 410 differs from the refresh signal 408 defined, e.g., under IEEE 802.3bp. In particular, the hybrid refresh signal 410 includes a known reference sequence 412, a data section 414, and FEC parity symbols 416. The data section 414 may convey, for instance, forward error correction (FEC) systematic symbols. The data section 414 may represent a systematic code in that the general purpose data provided for transmission may be output without change from the FEC encoder and reproduced in the data section 414. The FEC encoder may then append parity check symbols after the general purpose data. Note that when there is no general purpose data to transmit in the data section 414, the transmitter may instead send IDLE characters (for instance, the IDLE characters defined in 802.3bp, although other IDLE characters may be used) in the data section 414, or send another pre-determined set of data that indicates that no general purpose data is present for the link partner. IDLE characters fill the gaps between data packets during Ethernet traffic and indicate that no data is being transmitted.

Note that the hybrid refresh signal 410 is aligned with FEC frame timing. As shown in FIG. 4, the FEC frame includes data symbols 404 and parity symbols 406. The hybrid refresh signal 410 is aligned with the FEC frame timing in the sense that the parity symbols 416 in the hybrid refresh signal 410 start and end at the same time as the parity symbols 406 in a non-refresh FEC frame. That is, in one implementation, the parity symbols 416 in the hybrid refresh signal are aligned to the FEC frame boundaries 418 and 420. For instance, the parity symbols 416 may start and end at the FEC frame boundaries 418 and 420, as do the parity symbols 406 in the FEC frame 402 that are used when the low power mode is inactive.

The hybrid refresh signal 410 may alternate in time with the conventional refresh signal 408. Alternatively, the hybrid refresh signal may be sent in each instance where a refresh is scheduled. Any predetermined protocol between link partners may establish the schedule at which hybrid refresh signals are sent and at which conventional refresh signals are sent, and whether and how they are interleaved.

In one implementation, defined in the IEEE 802.3bp 1000BASE-T1 standard, the duration of the data symbols 404 is 3240 nanoseconds (ns), and the duration of the parity symbols 406 is 360 ns. The hybrid refresh signal 410 may be 1440 ns in duration. The reference sequence 412 may be the first 360 ns of the hybrid reference sequence. The data section 414 may be 720 ns in duration. The parity symbols 416 may be 360 ns in duration. The hybrid refresh signal may occur once every 24 frames, for instance, but more or fewer refresh signals may be sent in any given time period. In this example, the throughput provided by the hybrid refresh signal 410 is 1000 Mbps*720/3240/24=9.259 Mbps. The duration of each section of the hybrid refresh signal 410 may be lengthened or shortened in other implementations, e.g., to provide a longer data section 414, or a longer part of a known reference sequence 412.

Figure 5:
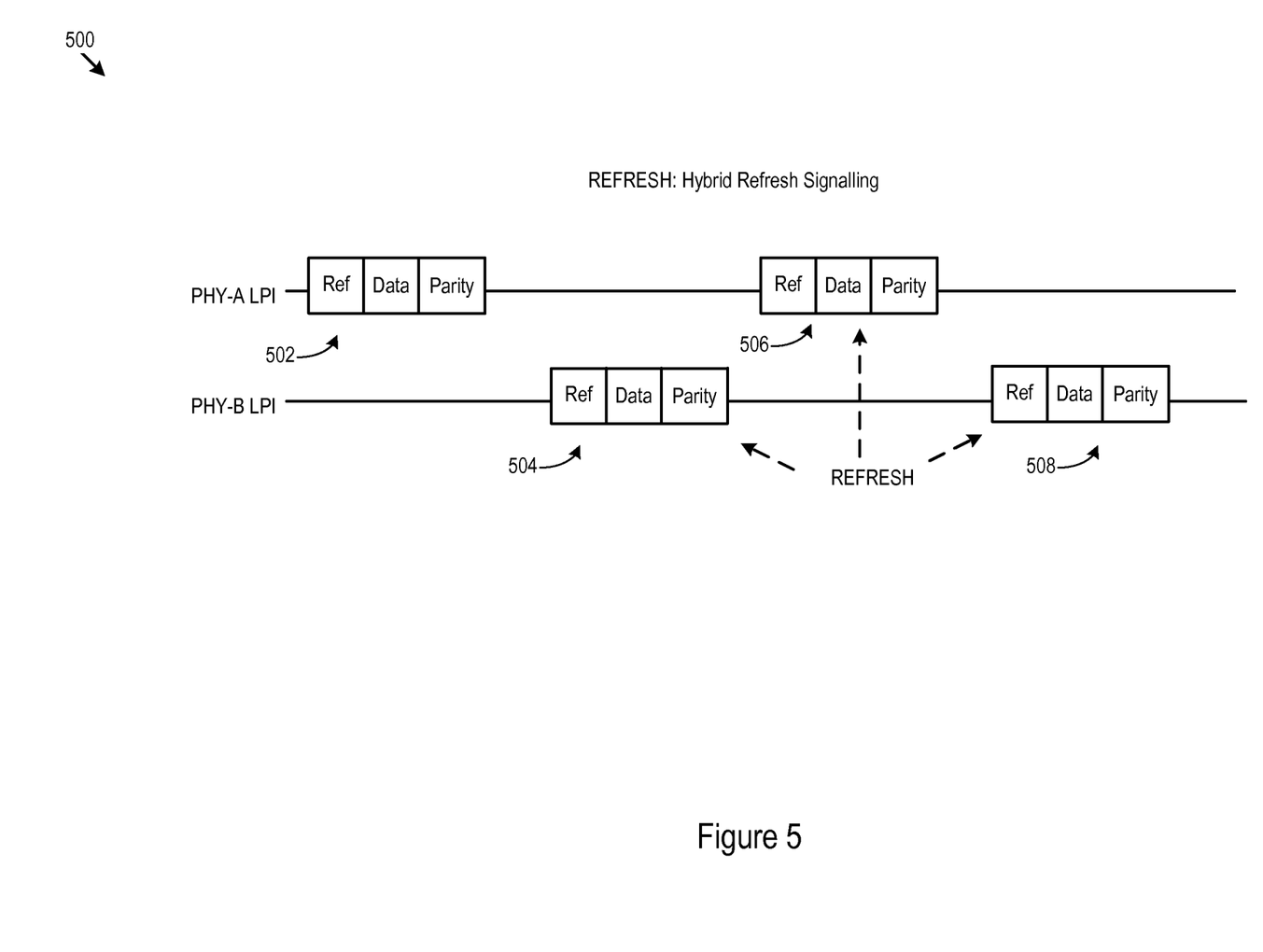
FIG. 5 shows staggered hybrid refresh signaling by link partners.

FIG. 5 shows staggered hybrid refresh signaling 500 by link partners. FIG. 5 shows a scenario in which each link partner is in LPI mode, and transmitting hybrid refresh signals (e.g., the hybrid refresh signals 502, 504, 506, and 508) according to any pre-established schedule or protocol by link partners. Note that the hybrid refresh signals are staggered so that one link partner is not transmitting its refresh signal at the same time as the other link partner. That is, the hybrid refresh signals may be non-overlapping.

Figure 6:
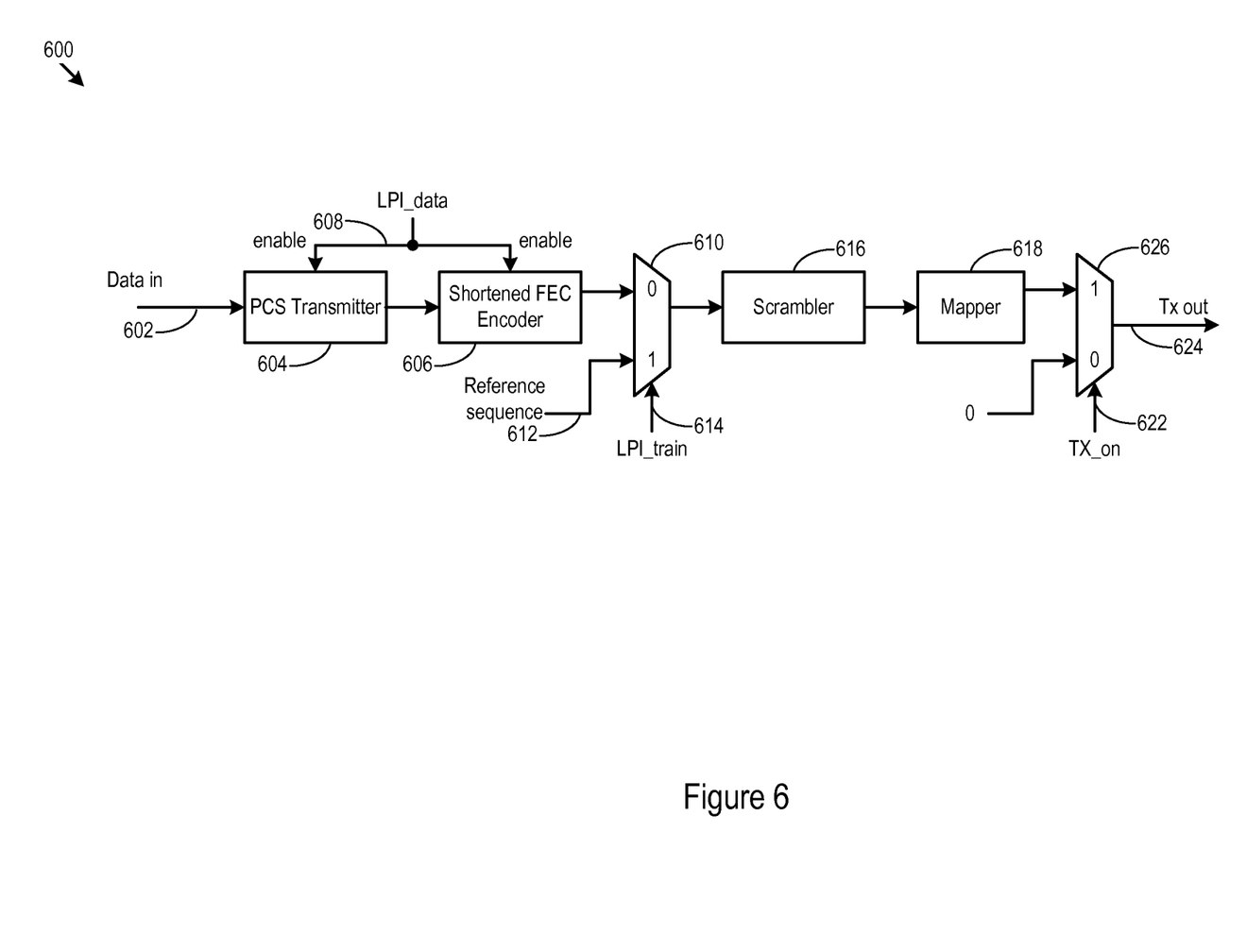
FIG. 6 shows a transmitter that may transmit hybrid refresh signals.

FIG. 6 shows a transmitter 600 that may transmit data using hybrid refresh signals. The transmitter 600 is discussed in connection with FIG. 8, which shows logic 800 that a system may implement to transmit hybrid refresh signals. The transmitter 600 receives (802), on the data input 602, general purpose data to transmit to a link partner during refresh (804). The transmitter 600 includes a physical coding sublayer (PCS) transmitter 604. The PCS transmitter 604 provides data to the shortened FEC encoder 606. An LPI data enable signal 608 activates the PCS transmitter 604 and shortened FEC encoder 606 when the transmitter 600 will transmit data using the hybrid refresh signal (804). The shortened FEC encoder 606 is a shortened coder in the sense that for the hybrid refresh signal 414, only a smaller section of data symbols are present (compared to the whole FEC frame of data symbols), and the shortened FEC encoder 606 assumes that all the data prior to the data section 414 is zero (or some other predetermined value) for the purposes of generating the data section 414 and parity symbols 416.

Figure 8:
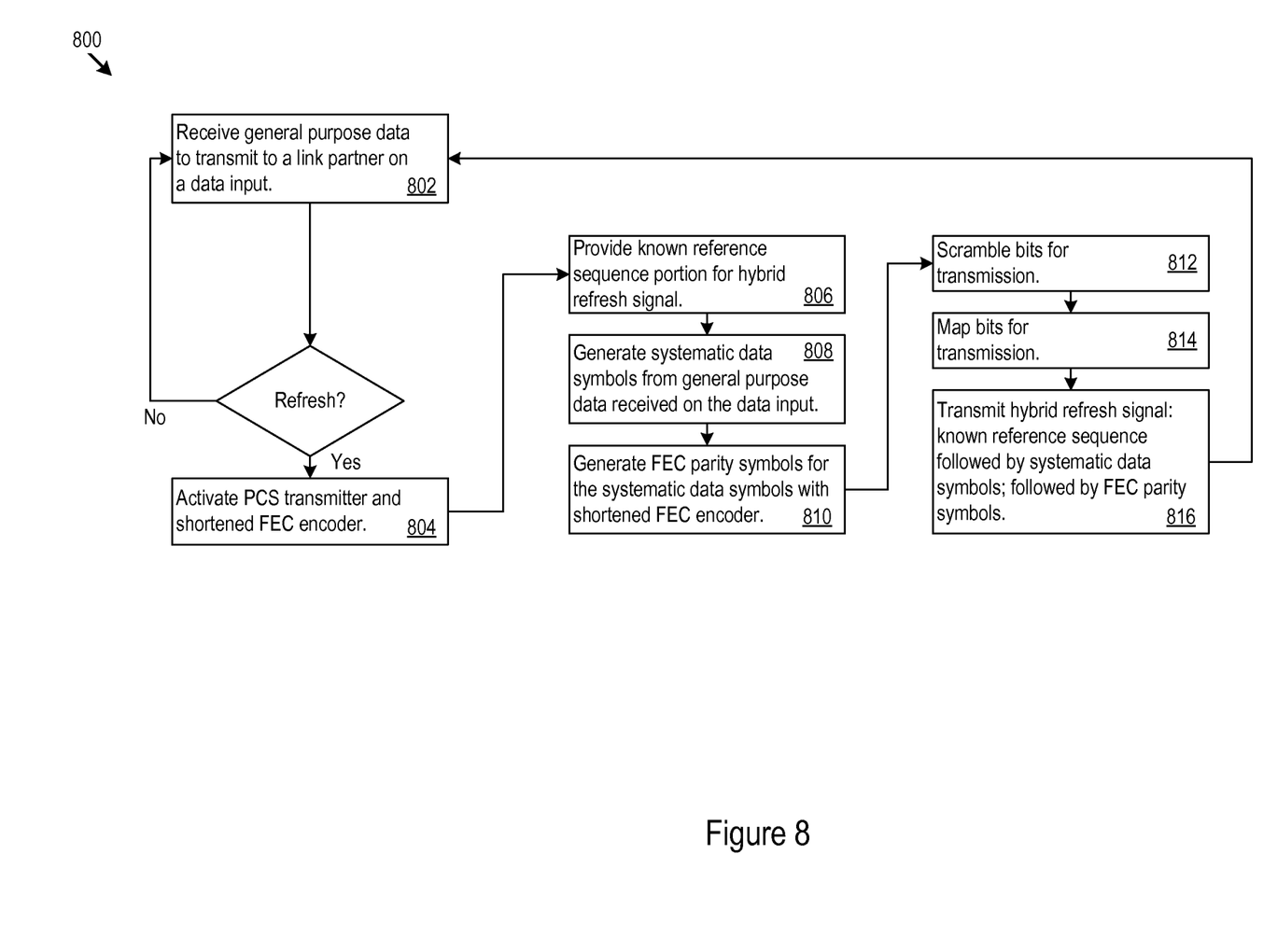
FIG. 8 shows logic for transmitting hybrid refresh signals.

The selector circuit 610 selects between a reference sequence input 612 and the output of the shortened FEC encoder 606 under control of the LPI training input 614. The transmitter 600 thereby provides the known reference sequence portion of the hybrid refresh signal (806). The shortened FEC encoder 606 provides both the data section 414 (808) and the parity symbols 416 (810). The reference sequence input 612 may provide, e.g., the data bits for the reference sequence 412. A scrambler circuit 616 scrambles the data bits to be transmitted (812) and a mapping circuit 618 maps the scrambled data bits to symbols for transmission (814), e.g., as specified in IEEE 802.3bp. An output selector 626 is under control of the transmit control signal 622. The transmit control signal 622 controls whether the transmitter output 624 is active, e.g., whether the transmitter output 624 provides the components of the hybrid refresh signal (816), or is inactive.

Accordingly, in one implementation the transmitter 600 creates and transmits a hybrid refresh signal 410 in the following manner, with reference to FIGS. 6 and 8. At the start of LPI refresh, the transmitter 600 sends a known reference sequence first: LPI_train=1, TX_on=1, LPI_data=0, the PCS transmitter 604 is disabled, and the FEC encoder 606 is disabled. There is no general purpose data communication during the known reference sequence.

The transmitter 600 follows the known reference signal with partial systematic symbols that convey the general purpose data received on the data input 602: LPI_train=0, TX_on=1, LPI_data=1, PCS transmitter 604 enabled, and the FEC encoder 606 provides shortened encoding of the general purpose data coming in on the data input 602.

The transmitter 600 follows the partial systematic symbols with parity symbols. In particular, the parity symbols may be FEC parity symbols. With reference to FIG. 6: LPI_train=0, TX_on=1, LPI_data=0, the PCS transmitter 604 is disabled, and the FEC encoder 606 is disabled. At this stage, the FEC encoder 606 finishes encoding and sends out parity symbols, and there is no general purpose data communication during the transmission of the FEC parity symbols.

Figure 7:
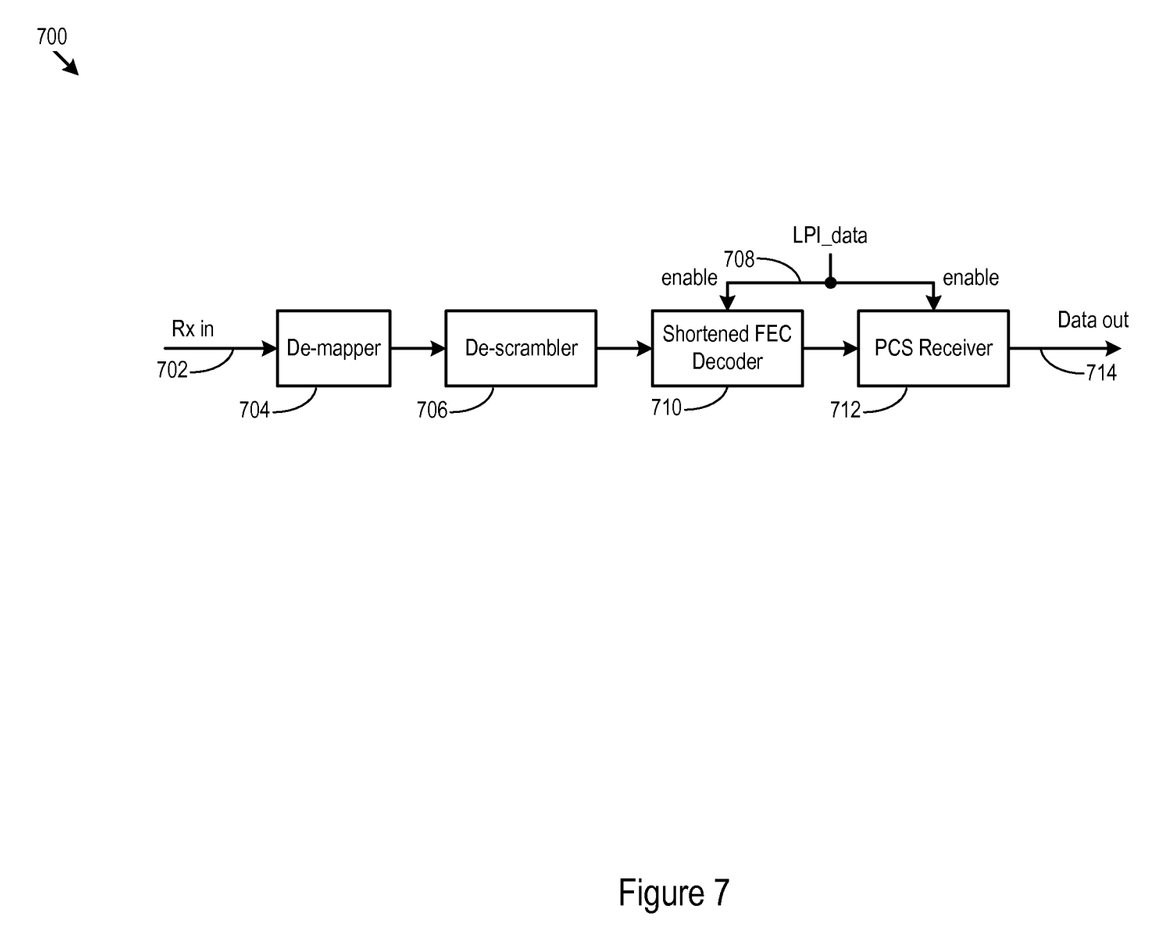
FIG. 7 shows a receiver that may receive hybrid refresh signals.

FIG. 7 shows a receiver 700 that may receive hybrid refresh signals. The receiver 700 is discussed in connection with FIG. 9, which shows logic 900 that a system may implement to receive hybrid refresh signals. The receiver 700 includes a receive signal input 702 (Rx in), which receives the hybrid refresh signal (902). A demapper 704 and a descrambler 706 provide the inverse operations (demapping (904) and descrambling (906)) of those applied by the mapper 618 and scrambler 616. An LPI data enable signal 708 activates the shortened FEC decoder 710 and the PCS receiver 712 (908) for receiving the general purpose data within the hybrid refresh signal according to known timing established between the link partners.

Figure 9:
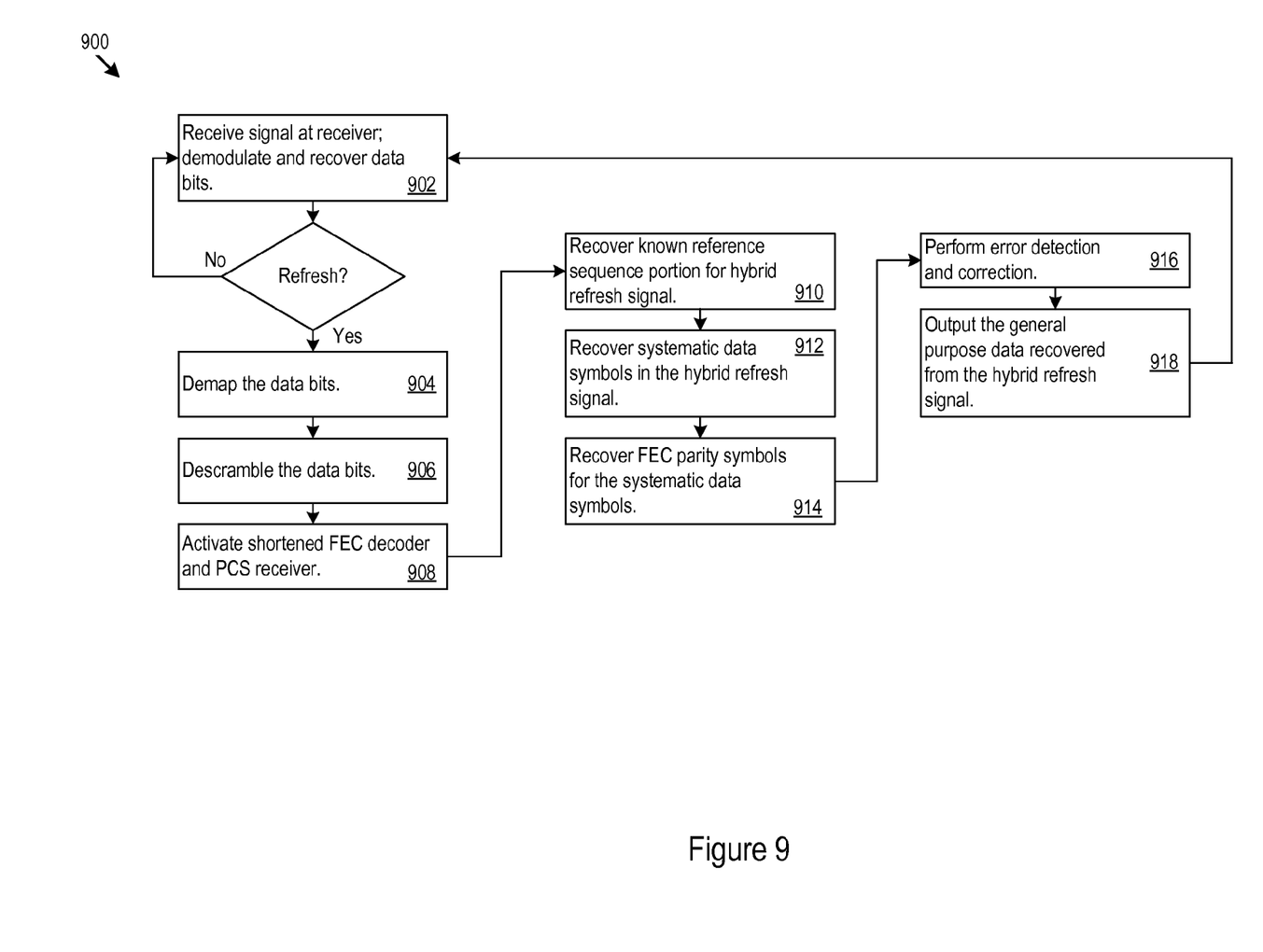
FIG. 9 shows logic for receiving hybrid refresh signals.

The receiver 700 thereby decodes and recovers the known reference sequence (910), the systematic data symbols (912), and the FEC parity symbols (914). With the FEC parity symbols, the receiver performs error detection and correction (916). The receiver 700 may then output the recovered general purpose data on the receiver data output 714 (918).

Accordingly, in one implementation the receiver 700 decodes the hybrid refresh signal 410 in the following manner, with reference to FIG. 7. At the start of LPI refresh, there is a known reference signal. The receiver 700 compensates for receiver timing with the known reference sequence. Initially, the FEC decoder 710 and PCS receiver 712 are disabled.

Partial systematic symbols follow the know reference sequence. These partial systematic symbols carry the general purpose data, e.g., passed through without change by the FEC encoder 606. The FEC decoder 710 starts buffering and preparing for shortened decoding. The hybrid refresh signal ends with FEC parity symbols. The FEC decoder 710 performs shortened FEC decoding with error correction responsive to the FEC parity symbols. At this point, the PCS receiver 712 is enabled and the receiver outputs the recovered general purpose data on the receiver data output 714.

The methods, devices, processing, and logic described above may be implemented in many different ways and in many different combinations of hardware and software. For example, all or parts of the implementations may be circuitry that includes an instruction processor, such as a Central Processing Unit (CPU), microcontroller, or a microprocessor; an Application Specific Integrated Circuit (ASIC), Programmable Logic Device (PLD), or Field Programmable Gate Array (FPGA); or circuitry that includes discrete logic or other circuit components, including analog circuit components, digital circuit components or both; or any combination thereof. The circuitry may include discrete interconnected hardware components and/or may be combined on a single integrated circuit die, distributed among multiple integrated circuit dies, or implemented in a Multiple Chip Module (MCM) of multiple integrated circuit dies in a common package, as examples.

The circuitry may further include or access instructions for execution by the circuitry. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed as circuitry among multiple system components, such as among multiple processors and memories, optionally including multiple distributed processing systems. Parameters, databases, and other data structures may be separately stored and managed, may be incorporated into a single memory or database, may be logically and physically organized in many different ways, and may be implemented in many different ways, including as data structures such as linked lists, hash tables, arrays, records, objects, or implicit storage mechanisms. Programs may be parts (e.g., subroutines) of a single program, separate programs, distributed across several memories and processors, or implemented in many different ways, such as in a library, such as a shared library (e.g., a Dynamic Link Library (DLL)). The DLL, for example, may store instructions that perform any of the processing described above or illustrated in the drawings, when executed by the circuitry.

Various implementations have been specifically described. However, many other implementations are also possible.

What is claimed is:

1. A system comprising:
a physical layer interface; and
media access control circuitry coupled to the physical layer interface, the media access control circuitry configured to:
determine when a low power mode of operation is active;
determine to send a hybrid refresh signal while the low power mode of operation is active; and
send the hybrid refresh signal through the physical layer interface by sending:
a known reference sequence;
systematic symbols representing data to be transmitted to a link partner; and
forward error correcting (FEC) parity symbols determined from the systematic symbols.

2. The system of claim 1, where:
the low power mode is defined by a specific communication protocol;
the specific communication protocol defines a specific protocol refresh signal to send when the low power mode of operation is active; and
the hybrid refresh signal differs from the specific protocol refresh signal.

3. The system of claim 2, where:
the known reference sequence of the hybrid refresh signal comprises a selected portion of a known reference sequence defined by the specific communication protocol.

4. The system of claim 3, where the selected portion comprises an initial portion of the known reference sequence defined by the specific communication protocol.

5. The system of claim 1, where the media access control circuitry is further configured to:
determine an FEC frame boundary for an FEC frame communicated when the low power mode is inactive; and
align the hybrid refresh signal with the FEC frame boundary.

6. The system of claim 5, where the FEC frame comprises a FEC parity field;
and where the FEC parity symbols in the hybrid refresh signal are aligned with the FEC parity field.

7. The system of claim 6, where the FEC parity field in the FEC frame and the FEC parity symbols in the hybrid refresh signal are aligned by ending at the FEC frame boundary.

8. The system of claim 1, further comprising a shortened FEC encoder configured to:
  pass through general purpose data unchanged to form the systematic symbols representing the data to be transmitted to the link partner; and
  determined the forward error correcting (FEC) parity symbols.

9. A method comprising:
  determining to transmit a hybrid refresh signal from a communication device to a link partner of the communication device; and
  transmitting the hybrid refresh signal by:
    transmitting a known reference sequence;
    transmitting general purpose data for the link partner, following the known reference sequence; and
    transmitting parity symbols for the general purpose data.

10. The method of claim 9, where the general purpose data immediately follows the known reference sequence, and the parity symbols immediately follow the general purpose data.

11. The method of claim 10, where:
  the known reference sequence comprises a subsection of a known reference signal defined in a specific communication standard for predefined refresh signal.

12. The method of claim 11, where the hybrid refresh signal is transmitted instead of the predefined refresh signal.

13. The method of claim 9, where transmitting the hybrid refresh signal further comprises:
  aligning the hybrid refresh signal to FEC parity symbol timing of an FEC frame.

14. The method of claim 13, where aligning further comprises:
  aligning completion of the parity symbols of the hybrid refresh signal to an FEC frame boundary of the FEC frame located where parity symbols for the FEC frame end.

15. The method of claim 9, where determining comprises:
  determining that a low power mode is active;
  determining to transmit the hybrid refresh signal to facilitate synchronization with the link partner; and
  transmitting IDLE characters when no general purpose data are present.

16. The method of claim 9, further comprising:
  determining that the general purpose data is available to send to the link partner; and
  transmitting the hybrid refresh signal in order to transmit the general purpose data.

17. The method of claim 9, where determining comprises:
  determining that a low power mode is active.

18. A system comprising:
  a physical layer interface operable to communicate with a link partner; and
  transceiver circuitry coupled to the physical layer interface, the transceiver comprising:
    transmitter circuitry operable to:
      when low power mode is inactive, transmit an outgoing FEC frame comprising FEC frame data symbols and FEC frame parity symbols that end at an FEC frame boundary;
      when low power mode is active, determine to transmit an outgoing hybrid refresh signal to the link partner for synchronization when no general purpose data is available to transmit to the link partner, and in response transmit:
        a known reference sequence;
        IDLE characters following the known reference sequence; and
        forward error correcting (FEC) parity symbols for the IDLE characters, following the IDLE characters;
      when low power mode is active, determine to transmit an outgoing hybrid refresh signal to the link partner when general purpose data is available to transmit to the link partner, and in response transmit:
        a known reference sequence;
        systematic symbols representing the general purpose data, following the known reference sequence; and
        forward error correcting (FEC) parity symbols for the systematic symbols, following the systematic symbols;
    receiver circuitry operable to:
      when low power mode is inactive, receive an incoming FEC frame comprising data symbols and parity symbols that end at an FEC frame boundary;
      when low power mode is active, receive an incoming hybrid refresh signal from the link partner, the incoming hybrid refresh signal comprising:
        a known reference sequence;
        systematic symbols following the known reference sequence; and
        forward error correcting (FEC) parity symbols for the systematic symbols, following the systematic symbols.

19. The system of claim 18, where the transmitter comprises:
  a shortened FEC encoder configured to generate the systematic symbols and the FEC parity symbols for the outgoing hybrid refresh signals.

20. The system of claim 18, where the transmitter is further configured to:
  transmit the FEC parity symbols of the hybrid refresh signal aligned to the FEC frame boundary.

21. The system of claim 20, where completion of the FEC parity symbols of the hybrid refresh signal aligns to the FEC frame boundary.

* * * * *